United States Patent [19]

Grataloup

[11] 4,053,088
[45] Oct. 11, 1977

[54] ROTARY DISPENSER WITH DELIVERY REGULATING VALVE AND SCRAPER
[75] Inventor: Xavier Roger Grataloup, Montereau (Seine et Marne), France
[73] Assignee: Nodet Gougis, France
[21] Appl. No.: 646,439
[22] Filed: Jan. 5, 1976
[30] Foreign Application Priority Data
Jan. 10, 1975  France .................... 75.00777
[51] Int. Cl.² ............... G01F 11/10; B65D 83/06
[52] U.S. Cl. .......................... 222/312; 222/314; 222/317
[58] Field of Search ............ 222/311, 312, 313, 346, 222/348, 349–351, 316, 317, 314
[56] References Cited
U.S. PATENT DOCUMENTS
982,018  1/1911  Patric ........................... 222/350
3,121,515  2/1964  Johnson et al. ................ 222/317

Primary Examiner—Robert B. Reeves
Assistant Examiner—David A. Scherbel
Attorney, Agent, or Firm—Diller, Brown, Ramik & Wight

[57] ABSTRACT

A regulating dispenser comprises a hopper and a movable surface for withdrawing material from the bottom of the hopper to the outside thereof. The movable surface is constituted by at least one area arranged so that the regulating dispenser does not deliver over the whole of its width. A movable delivery regulating valve and a scraper independant of the valve and bearing on the movable withdrawing surface are provided. The scraper is fast to the fixed wall of the hopper and bears elastically on the movable surface so as to ensure sealing in said at least one area from which the dispenser does not deliver.

10 Claims, 13 Drawing Figures

ROTARY DISPENSER WITH DELIVERY REGULATING VALVE AND SCRAPER

BACKGROUND OF THE INVENTION

1. Field of the Invention

The present invention relates to a regulating dispenser, for example for seeds. More particularly it relates to a regulating dispenser comprising a hopper, a movable surface for withdrawing material from the bottom of the hopper to the outside thereof and means for regulating the delivery rate.

2. Description of the Prior Art

Mostly, these dispensers are of the type shown in the accompanying drawings (FIGS. 1 and 1a), in which a grooved cylinder 1 is rotated in a slot 1' — formed in the lower part of a fixed wall 2 of a hopper or dispensing box 2' — so that the grooves 5 scoop from the mass 4 contained in the box and withdraw a predetermined amount of the material in the form of a layer, a valve 3 displaceable in its plane, for example parallel to said fixed wall, enabling the thickness e of the layer (FIG. 1b) to be adjusted as desired.

Such an arrangement is to be found, for example, in British patent specification No. 7121 AD 1913 and DT Pat. No. 235,688.

When small delivery rates are desired with a large take-up surface for the material, it is advantageous to avoid arching and to have a large surface at the base of the hopper, which reduces the height thereof, to replace the cylinder with continuous grooves of FIG. 1 by the aligned pinion wheels forming a smooth part between recesses and to scrape off the material which could be entrained on this smooth part.

A construction of this type is the subject of U.S. Pat. No. 3,387,751, relating to a regulating dispenser comprising a recessed cylinder and a fixed scraper. To vary the delivery rate, the cylinder is moved along its axis so that a recessed section comes more or less to face an outlet orifice. Another solution, which has the same drawbacks, is shown in FIGS. 2 and 2a. The fixed wall 2 scrapes off the material 4 between the recesses: the fixed wall 2 forming part of the dispensing box, there is necessarily play between the pinion cylinder 1 and this wall and on account of this, a lack of sealing; as a result, the particles of the material to be dispensed slip between the cylinder 1 and the wall 2 and wear said wall 2 and cylinder 1, which become scored, resulting in increases in the flow rate of the dispensed material.

Lastly, dispensers are known in which the withdrawal of the material from the hopper is effected by a conveyor belt associated with an adjustable slot, for example those which are the subject of French Pat. Nos. 771,156 and 1,137,836 in the name of Applicant. These arrangements have the same drawbacks as the foregoing ones.

OBJECTS AND SUMMARY OF THE INVENTION

It is an object of the invention to overcome these drawbacks.

It is a particular object of the invention to provide a regulating dispenser in which inadequacy of sealing is eliminated.

According to the invention there is provided a regulating dispenser not dispensing over the whole of its width and comprising a movable surface for withdrawing material from the bottom of a hopper to the outside as well as a movable valve for regulating the flow rate of the material to be dispensed, wherein a scraper fast to the fixed wall of the hopper is applied elastically onto the movable surface.

The movable surface may be either a recessed cylinder, in one piece or constituted by aligned pinion wheels forming a smooth part between the recesses; or a carpet or conveyor belt, smooth or provided with aligned recesses.

The scraper can pass between the movable surface and the measuring valve. It can be constituted by a rigid blade notched in the delivery areas of the movable surface or by several rigid blades acting only outside of said delivery areas, the one or more blades being on the one hand fixed to the hopper by one of their edges and applied onto the movable surface and onto the valve by elastic elements acting on the other edge of the blade. Again, the scraper can be constituted by a flexible blade, for example strip steel or brass foil, notched in the delivery areas of the movable surface, or by several flexible blades acting only outside of said areas, the one or more blades being fixed under tension between the valve and the movable surface by their edge opposite their edge supported on this surface.

The regulating or adjusting valve may be constituted by a sliding valve to regulate the height of the product between the movable surface and the bottom of the hopper wall.

In a preferred embodiment, the adjusting valve is a cylinder rotatable on its axis substantially parallel to the dispensing plane of the movable surface, flats being arranged on this cylinder opposite the recesses.

To reduce the flow rate, the regulating cylinder is rotated in reverse direction to the direction of rotation or displacement of the movable surface. To increase the flow rate the rotation of adjustment is done in the direction of movement of the dispensing surface.

BRIEF DESCRIPTION OF THE DRAWINGS

In order that the invention may be more fully understood various embodiments of regulating dispensers according to the invention are described below, purely by way of non-limiting example, with reference to the accompanying drawings, in which.

DESCRIPTION OF PREFERRED EMBODIMENTS

Figure 1A:
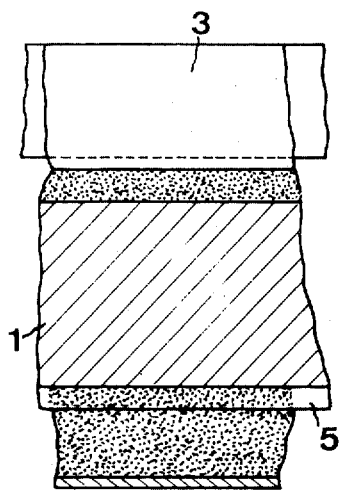
FIG. 1a being a partial sectional view along the line AA of FIG. 1.
Figure 1:
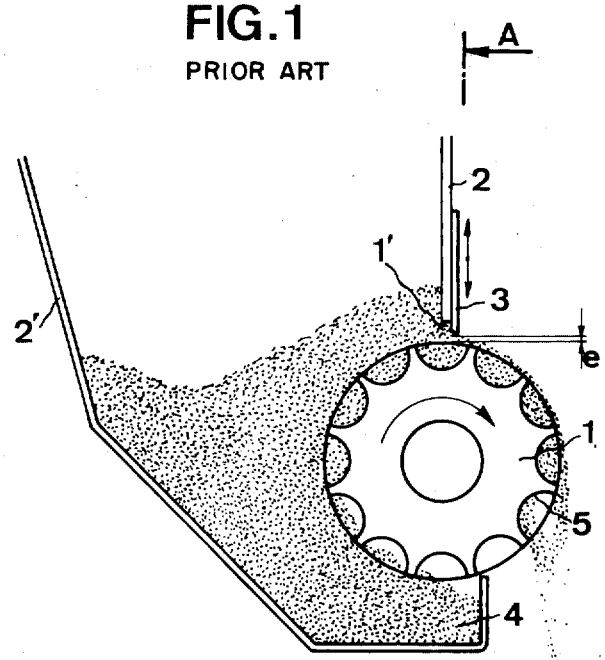
FIG. 1 shows a known dispenser with a grooved cylinder.
Figure 2A:
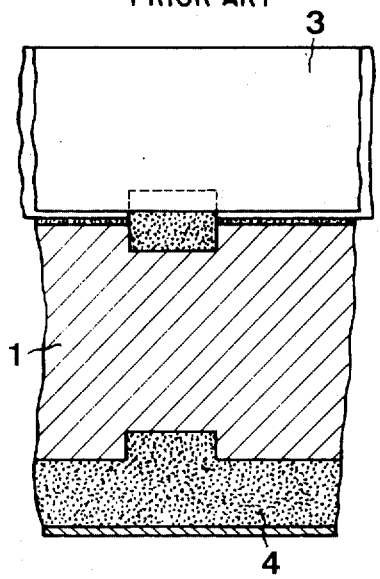
FIG. 2a is a partial sectional view along the line AA of FIG. 2.
Figure 2:
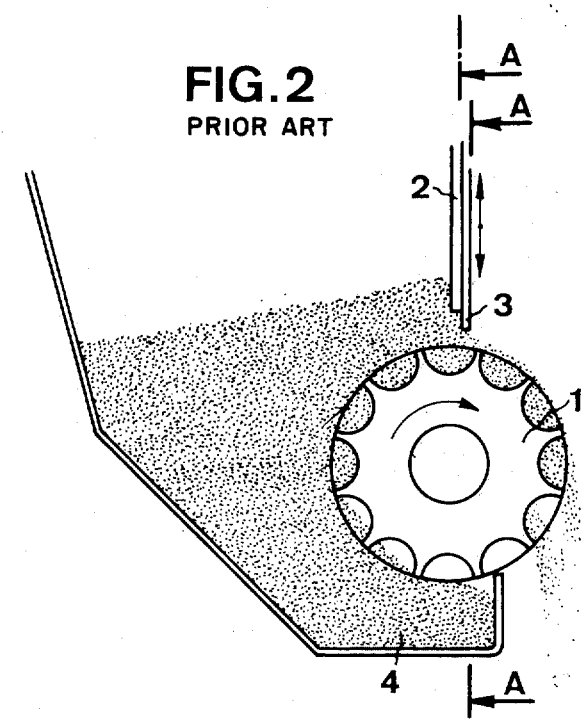
FIG. 2 shows a known dispenser with a recessed cylinder.
Figure 3A:
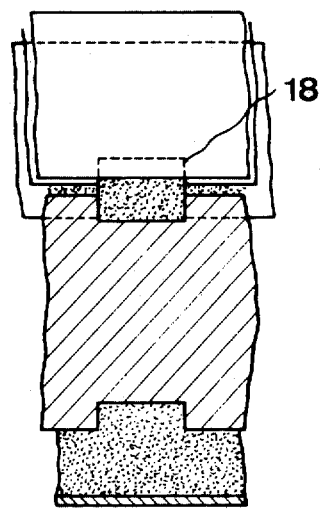
FIG. 3a is a partial sectional view along the line AA of FIG. 3.
Figure 3:
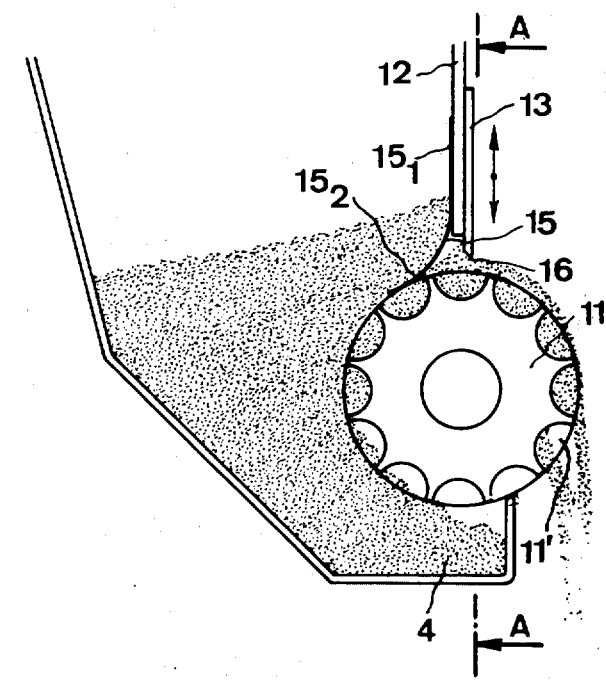
FIG. 3 is a vertical sectional view of a first embodiment of a regulating dispenser according to the invention.

In the embodiment shown in FIGS. 3 and 3a can be seen the dispensing cylinder 11 with its recesses 11', the fixed wall 12 of the material dispensing hopper 4, the thickness adjusting valve 13, a metal foil 15 fixed at $15_1$ on the wall 12 and whose free end $15_2$ is applied with light pressure against the cylinder 11, said foil comprising notches 18 at the level of the cylinder recesses 11' and at that of the wall 12. In this arrangement a cavity 16 is formed between the notched foil 15, the valve 13 and the cylinder 11. When the material is stopped at the level of the valve 13 it caves in at the sides and is engaged in the cavity 16; then entrained by the cylinder 11 in its smooth part, it scratches the cylinder by rubbing on the end of the wall 12 or on the valve 13 when it is closed to the maximum. If the fixed wall 12 and the valve 13 always remained sufficiently separated from the cylinder 11 to allow material to pass without binding on the smooth part of the cylinder 11, the latter would not be damaged but the adjustment of the flow rate by the valve 13 would be practically ineffective for low flow rates.

Figure 4A:
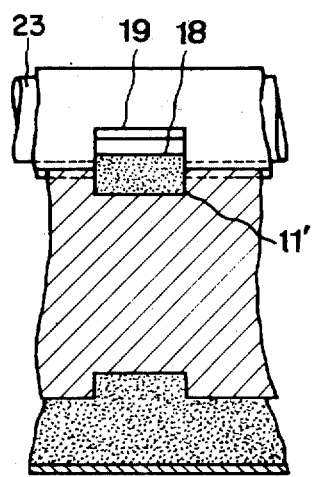
FIGS. 4 and 4a are views similar to those of FIGS. 3 and 3a, of a preferred embodiment of a regulating dispenser according to the invention.
Figure 5:
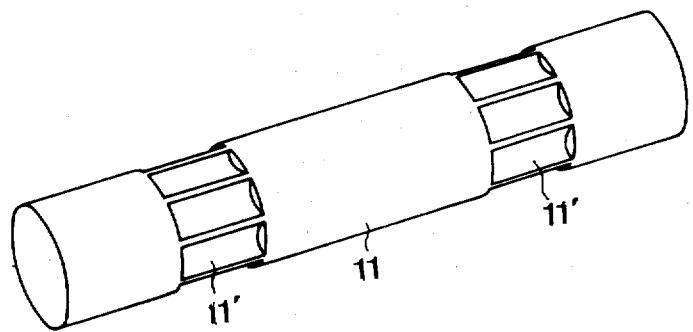
FIGS. 5, 6 and 7 show respectively in perspective the recessed cylinder, the metal foil and the cylindrical valve used in a dispenser according to the invention.
Figure 6:
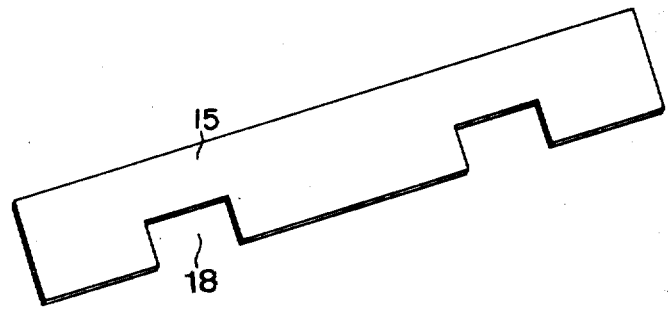
Figure 7:
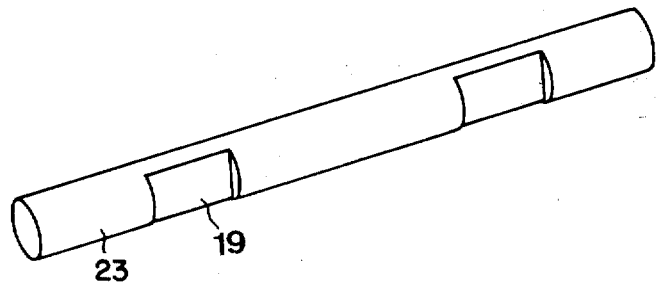

In the preferred embodiment of FIGS. 4 and 4a, there will again be seen the cylinder 11 with one or several rows of recesses 11' (FIG. 5), the fixed wall 12 of the hopper leaving a slot $12_1$ in the usual way between its lower end and the cylinder 11. In the external vicinity of the wall 12 and substantially tangent to the plane of the latter is mounted above the cylinder 11, an adjusting valve-cylinder 23 rotating around an axis parallel to the axis of the cylinder 11 (to increase the flow rate the cylinder-valve is rotated in the same direction as that of the rotation of the cylinder 11; to reduce the flow rate the cylinder-valve is turned in the reverse direction to that of the rotation of the cylinder 11). The cylinder 23 comprises rows of flats 19 (FIG. 7) arranged opposite the recesses 11'. The metal foil 15 is provided with notches 18 (FIG. 6); it is passed between the cylinder 23 and the cylinder 11 so that the notches 18 are opposite recesses 11' of the cylinder 11 and the flats 19 of the cylindrical valve 23. On its unnotched side the foil 15 is fixed to a bar 21 movable in a stud-hole 20 fast to the hopper and on which act first ends of tension springs 17 whose other ends are fixed to the wall 12.

Figure 4:
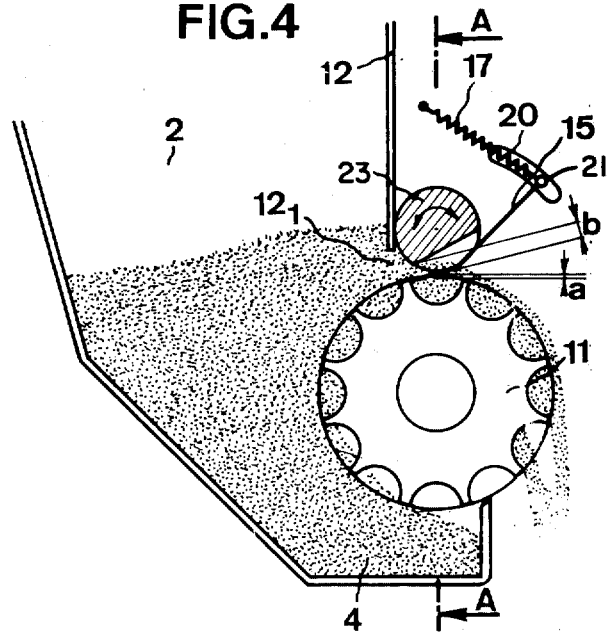

Under these conditions, the material or product to be dispensed 4 is entrained by the cylinder 11. Between the recesses 11' it is stopped by the foil 15 and the valve 23. Above the recesses 11', the valve 23, according to its angular position, allows an adjustable thickness b of material to pass. In FIG. 4, a is the minimum thickness of the layer of material.

The recessed cylinder is driven by any suitable means as well as the cylindrical valve for its adjustment.

This feature thus eliminates the cavity 16 (FIG. 3) and the aforesaid drawbacks resulting therefrom. Wear of the surfaces is thus avoided and it is possible to dispense high or low flow rates without difficulty.

Figure 5A:
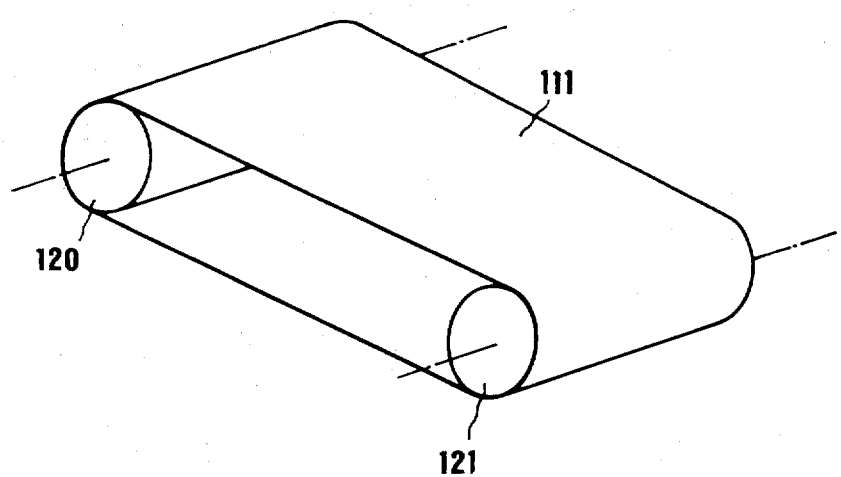
FIG. 5a is a perspective view of a smooth carpet.
Figure 6A:
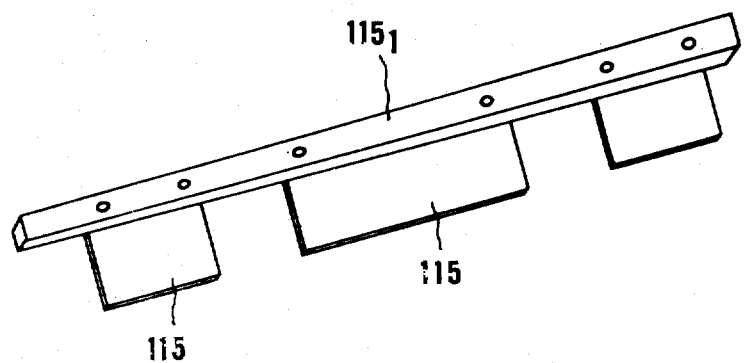
FIG. 6a shows a scraper.

The invention may be used to ensure the fluidtightness of a smooth belt dispenser 111 (FIG. 5a) which can be a thin strip steel driven on cylinders 120 and 121 of which the localisation of the flow rate at different points of its width presents in known assemblies the same interest and the same difficulties as other equipment proposed hitherto. In this embodiment, according to another feature of the invention, the scraping element may be constituted by foil elements 115 fixed to a common bar $115_1$ (FIG. 6a) whose width corresponds to that of the flow-less areas, or by a notched rigid plate pulled back by springs 17, or by several rigid plates connected to a common bar.

What I claim is:

1. A regulating dispenser comprising a hopper having a dispensing opening of a predetermined height and length, a dispensing member positioned within said dispensing opening for the full width thereof and at a heighth less than the height of said opening and in combination with said hopper defining a slot through which material within said hopper may be moved out of said hopper above said dispensing member, said dispensing member having a movable dispensing surface positioned for movement from within said hopper to outside of said hopper, said movable dispensing surface including at least one delivery area and at least one non-delivery area spaced along the width of said opening, a regulating valve positioned between said moving surface and said hopper above said opening for controllably partially closing said slot, and a scraper mounted independently of said regulating valve and bearing on said movable dispensing surface close to said regulating valve, said scraper bearing elastically on said movable dispensing surface at least in said non-delivery area to ensure sealing of said non-delivery area against delivery of material from said hopper through said slot.

2. Dispenser according to claim 1, wherein the scraper passes between the movable dispensing surface and the regulating valve.

3. Dispenser according to claim 1, wherein the regulating valve is a cylinder rotatable on its axis and having at least one flat, each being arranged in alignment with a respective delivery area of said movable dispensing surface.

4. Dispenser according to claim 1, wherein the scraper is constituted by a rigid blade notched in alignment with each delivery area of said movable dispensing surface and being engaged with the valve and the movable dispensing surface with an edge of said scraper contacting said movable dispensing surface, springs acting on an edge of said blade opposite the edge in contact with the movable dispensing surface so as to urge the blade thereagainst.

5. Dispenser according to claim 1, wherein the scraper is constituted by several rigid blades acting only outside the delivery areas and being engaged with the valve and the movable dispensing surface with edges of said blades contacting said movable dispensing surface, springs acting on edges of said blades opposite the blade edges in contact with the movable dispensing surface so as to urge the blades thereagainst.

6. Dispenser according to claim 1, wherein the scraper is constituted by a flexible blade notched in alignment with the delivery areas and fixed under tension between the regulating valve and the movable dispensing surface by its edge opposite the portion in contact with said movable dispensing surface.

7. Dispenser according to claim 1, wherein the scraper is constituted by several flexible blades acting only outside the delivery areas and applied under tension between the regulating valve and the movable dispensing surface by their edges opposite the portions in contact with the movable dispensing surface.

8. Dispenser according to claim 1, wherein the scraper is constituted by a flexible blade notched in the delivery areas and being in contact with the regulating valve and the movable dispensing surface, springs acting on the edge of said blade opposite the portion in contact with the movable dispensing surface so as to urge the blade thereagainst.

9. Dispenser according to claim 1, wherein the scraper is constituted by a plurality of flexible blades acting only outside the delivery areas and being in contact with the regulating valve and the movable dispensing surface, springs acting on the edges of said blades opposite the portions in contact with the movable dispensing surface so as to urge said blades thereagainst.

10. Dispenser according to claim 1, wherein the scraper is constituted by a rigid blade notched in the delivery areas and being in contact with the regulating valve and the movable dispensing surface, springs acting on the edge of said blade opposite the portion thereof in contact with the movable dispensing surface so as to urge the blade thereagainst.

* * * * *